July 14, 1953 A. H. MERRILL 2,645,041
EDUCATIONAL DEVICE TEACHING READING AND ARITHMETIC
Filed Oct. 9, 1951
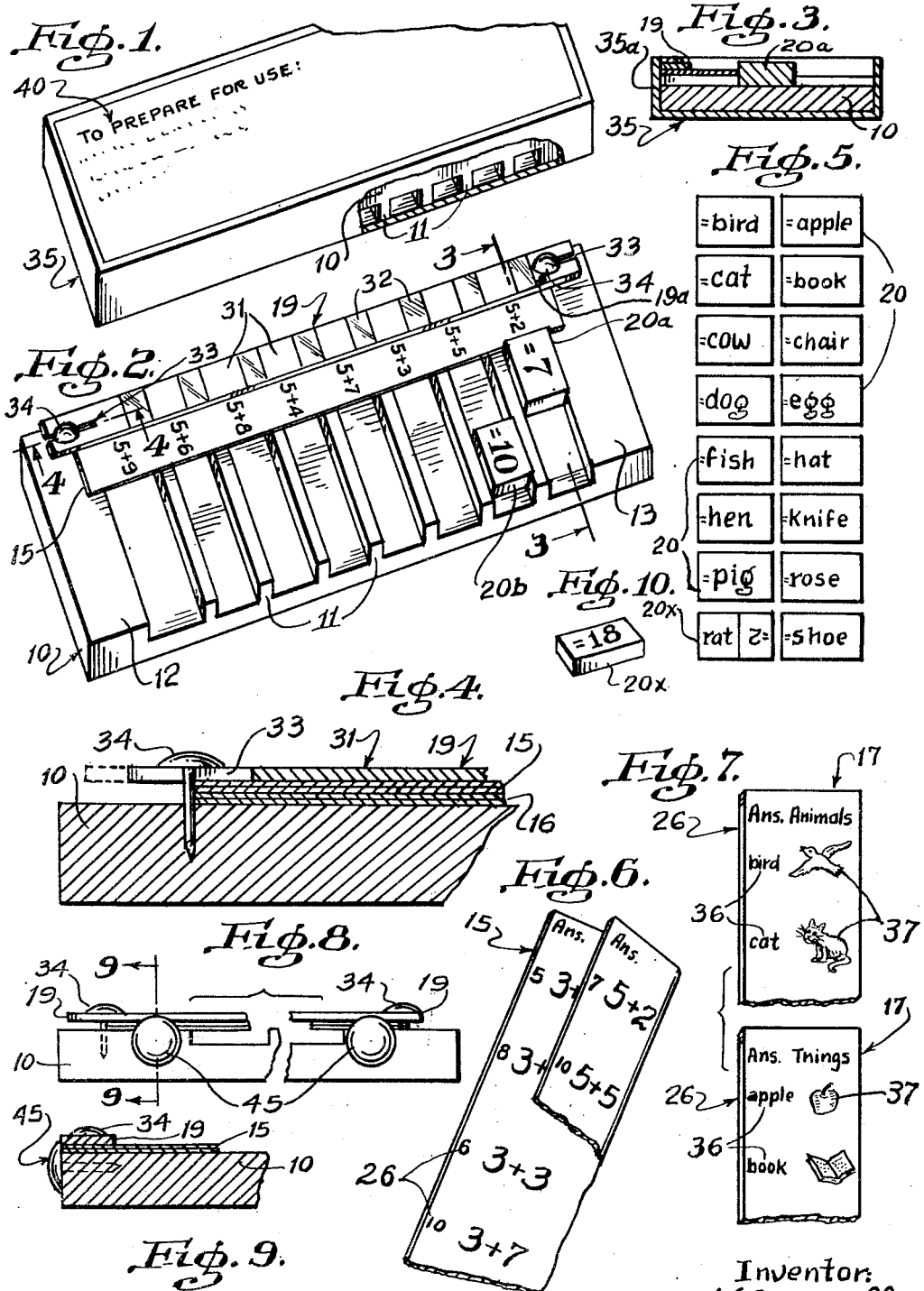
Inventor:
Albert H. Merrill Patented July 14, 1953

2,645,041

UNITED STATES PATENT OFFICE 2,645,041

EDUCATIONAL DEVICE TEACHING READING AND ARITHMETIC

Albert H. Merrill, Los Angeles, Calif.

Application October 9, 1951, Serial No. 250,459

3 Claims. (Cl. 35—73)

This invention relates to an educational amusement device to aid children in learning to read and to solve simple arithmetical problems.

A general object of the invention is to produce an attractive, instructive, educational toy of the above stated kind, wherein a low cost of manufacture is maintained without impairing the wearing quality of the device or reducing the efficiency of its operation.

A more specific object is to provide an improved means usable to check up on the correctness of the answers indicated by "answer blocks" which the child selects and places alongside the various problems in a column of problems carried by a selected problem slip so mounted that said answer blocks may be positioned alongside thereof.

The above stated objects are attained, in part, by providing a very simple structure upon which selected problem slips are mounted, so that, when said structure is made mainly of wood, a single multi-grooved board with a few inexpensive adjuncts including a cover member, can be used to construct the embodiments of the invention hereinafter described.

The attractive appearance of the device which forms the subject matter of this application is increased and interest added to its use by providing a slide of transparent material which is in part painted or printed upon so as to have alternate opaque and transparent portions, the latter portions forming "windows" through which answers to the problems are observable when said slide is in one of the positions to which it is adjustable.

Ever present problems, in the construction and marketing of educational devices of the kind to which this invention pertains are to provide a structure that will withstand hard usage by children and that can be manufactured at a sufficiently low cost to be sold at an inviting price.

The simplified educational device hereinafter described and claimed, is the result, along with an investigation of the prior art, of a great deal of inventive effort and experimentation, accompanied by repeatedly discarding one conception and adopting another more nearly approaching the ideal in view. Said device is an improvement, in certain respects, upon the problem teaching device described and claimed in my co-pending application Serial No. 227,336, filed May 21, 1951; and also has features in common with the educational device disclosed in my co-pending application Serial No. 258,122, filed November 26, 1951.

This application relates to an improvement upon the problem teaching device using answer blocks described and claimed in my co-pending application filed May 21, 1951, which matured into Patent No. 2,625,750, issued to me January 20, 1953; and also has features in common with the educational device described and claimed in my co-pending application 258,122, filed November 26, 1951, which will bear the same patent date.

Other objects, advantages and features of invention will hereinafter appear.

Referring to the accompanying drawing, which illustrates preferred, reduced to practice embodiments of the invention, Fig. 1 is a perspective view of the device as it appears when not in use with its base or body portion inverted and contained in the tray provided for it, a portion of said tray being broken away disclosing a fragment of the ribbed side portion of said base member, which portion is uppermost when the device is in use; and parts also being broken off to contract the size of the view.

Fig. 2 is a perspective view of the device, showing a problem slip mounted thereon to teach addition, the tray being omitted.

Fig. 3 is a cross section on line 3—3 of Fig. 2, the tray being supplied.

Fig. 4 is a fragmentary, longitudinal section on line 4—4 of Fig. 2, the scale being enlarged.

Fig. 5 is a view of the complete set of answer blocks used, shown with their word bearing faces uppermost.

Fig. 6 is a fragmentary perspective view of one of the addition problem slips or sheets in a partly folded condition.

Fig. 7 is a dual, fragmentary view, slightly in perspective showing the opposite faces of the two page pictorial problem slip.

Fig. 8 is a rear elevation of a slightly modified base member which is provided with back stop means for the mounted problem strip, so that the device may be operated without the base member being placed in the tray, ribbed side up.

Fig. 9 is a fragmentary cross section on line 9—9 of Fig. 8.

Fig. 10 is a perspective of a block bearing two numerical answers.

Referring in detail to the first seven views of the drawing, an elongated, substantially rectangular base board or base plate 10 is transversely grooved across its upper face in such a manner as to provide it with a series of upstanding, parallel, spaced apart ribs 11; and at one end said base board has an ungrooved end portion 12 and at its opposite end a like ungrooved, smooth upper face portion 13.

A plurality of problem slips 15, 16 and 17 are provided (more may be used, if desired), which are mountable on said base plate so as to extend over the aforesaid series of ribs in an overlying relation to one side portion only of the upper face of said base plate and partly in an underlying relation to a slide 19, more fully described later. Also there is provided a set of small, domino-like blocks, desirably sixteen in number, blocks 20a and 20b of these blocks being shown in Fig. 2 with their number bearing sides uppermost and these blocks together with the remainder of the blocks 20 being shown in Fig. 5 with their word bearing sides uppermost.

Each of the numerical problem slips 15 and 16 is desirably made of tough, cardboard and may be one sixty-fourth of an inch thick. Each is foldable along its midlength and each bears upon it half of an addition table extending from two plus two to nine plus nine. Each of said slips 15 and 16 has four elongated pages, and when the sheet is put into operative position in the manner presently to be explained, the combinations of one numeral, for example "5" (see Fig. 2) with all the numerals to be added to it, are displayed on its uppermost page. Said problem slips 15 and 16 also carry on each page a column of answers 26 to its problems (see Fig. 7).

In the column of addition problems shown on the slip 15 the numbers are "scrambled," rather than increased in a regular manner, so as more efficiently to train the memory.

The aforementioned slide 19 is desirably made of a somewhat rigid transparent substance, for example Lucite, spaced apart sections 31 of which, along its length are coated with an opaque substance, thus providing between them transparent window sections 32.

At each end said slide 19 has along its midwidth a slot 33 through which loosely passes the stem of a tack 34, thus holding the slide in place and properly limiting its sliding movement, so that at one limit of said movement it conceals the spaced apart answers of said column of answers, and at the opposite limit of its movement the answers of said column appear through said windows 32.

The base plate 10 and its accessories are so constructed that it is not necessary to house them in a complete box when the device is not in use, but these parts are then sufficiently contained and protected by a cover member or rectangular tray 35 within which said base plate may be contained in an inverted position, as shown in Fig. 1, with the answer blocks and problem slips snugly packed thereunder.

The aforesaid pictorial problem slip 17 carries only sixteeen problems, eight inscribed on each of its faces, and, therefore, does not need to be folded. When this slip is in its operative position the column of words 36 along its left side will underlie the slide 19 and its column of pictures 37 will be clear of said slide. Each of said pictures has opposite to it a word which names the pictured object, so that the pictures may be said to represent problems to which the words are answers.

Preparatory to putting into use the device shown in Figs. 1 to 7, following the directions 49 inscribed upon the bottom of the inverted base plate, the operator will invert the tray 35 and then, after depositing the tray and contained structures upon a table top or the like, will lift off said tray, thus positioning said base plate with its ribbed side up as shown in Fig. 2. Then, before starting to use the device, the base plate should be replaced within the tray 35 as shown in Fig. 3, in which position the side wall 35a of the tray forms a stop or abutment for whatever problem strip has been placed in its operative position under the slide 19, so that abutting the answer blocks against such problem strip does not laterally displace it.

The mounted problem slip rests upon the tops of the ribs 11, and the lower faces of the blocks, when said blocks are in use to indicate answers, seat at a lower level in the grooves between said ribs. Therefore, the answer bearing faces of the seated blocks are lowered nearly to the level of the problem slip being used, as is desirable.

In putting a foldable problem slip 15 or 16 into its mounted position, the slip, after having been so folded as to bring the desired page uppermost, will have its free edge portions tucked under the slide 19, and when fully in place each of its ends will substantially abut against a stem of one or the other of the aforesaid tacks 34, the slip thus being held against endwise displacement.

In any case, after a problem slip has been put into its mounted position (shown clearly in Figs. 2 and 3), the slide 19 will be adjusted to a position wherein its opaque portions 31 conceal the aforesaid answers, (whether numerals or words), and then after eight of the answer blocks have been selected and supposedly put into problem answering positions, the slide 19 will be so readjusted as to bring its "windows" 32 into register with the answers, thus making it possible to check up as to the correctness of the answers. Said slide is shown provided with a small aperture 19a into which the point of a pencil may be inserted to move the slide.

In Fig. 4 the numeral bearing slips 15 and 16 are both shown nest-under the slide 19. If desired, the clearance under said slide may be wide enough to allow all three of the problem slips to be inserted under the slide.

In Figs. 8 and 9 is shown a modification wherein the base member carries stop means which prevent rearward displacement of the mounted problem slip (or slips in case two or more are inserted under the slide). Said stop means may consists of a pair of tacks 45 driven into the upper part of the back edge portion of the base member, one near each end thereof, in such positions that the upper edge portions of the tack heads act as stops which prevent rearward displacement of the mounted problem slips. The baseboard 10 and its other adjuncts are constructed in the manner already described, and are, therefore, designated by the same reference characters. When this modification is used it is not necessary to place the base board back into the tray, ribbed side up before using, but the base board may be used independently of the tray reserviing the latter to contain the blocks from which answer block selection is being made. In both embodiments the mounted problem strip is located between the stop means and the blocks when the latter are in answer indicating positions.

The attractiveness of the device may be increased by appropriately coloring the miniature pictures that will be used for the pictorial problems.

When the device is used to teach addition there is no need of using a block bearing an answer numeral less than "4," that numeral representing the sum of two plus two. But in teaching subtraction it is necessary that numerals "2" and "3" be used on the blocks. Therefore, in order to adapt the device for teaching subtraction along with addition, without using more than sixteen blocks, a block 20x is shown having "18" inscribed on one face and having inscribed on its opposite face "2" together with one of the shorter words, "rat" being selected by way of example. The numeral "2" will be inverted in relation to the word "rat" so that it will be properly positioned when the end portion of the block on which it is inscribed is directed toward a problem slip carrying a subtraction problem the answer to which is two. A subtraction table extending from four minus two to eighteen minus nine will contain sixty-four problems, which can be inscribed on two four page foldable problem strips, like the aforesaid strips 15 and 16, and how to construct and use such strips will be obvious from the foregoing description of their use in addition. In subtraction no number so large as "18" will be used. Therefore the side of the block 20x bearing that numeral will be then left downward and only the "2" inscribed on the block used.

It is to be understood that various structural details may be modified without exceeding the scope of the claimed invention. For example, pasteboard answer bearing members my be substituted for the answer blocks which have been described. However, blocks are deemed to be more interesting to children, and when used may each, if desired, carry printed matter on more than two faces.

I claim:

1. In an educational device of the kind described, an elongated base plate having a series of substantially parallel spaced apart ribs extending transversely across its upper face, a problem slip of less width than said base plate positionable thereon in an overlying relation to one side portion only of the upper face thereof, said slip having inscribed upon it a column of problems in which, when the slip is positioned as aforesaid, the individual problems register with the spaces between said ribs, a set of blocks wherein individual blocks are seatable alongside said problem slip, when the latter is positioned as aforesaid, into the spaces between said ribs, said blocks having inscribed upon them answers to the problems carried by said problem strip, the lower faces of the seated blocks being at a lower level than said problem slip when positioned as aforesaid and a tray in which said base plate is fittable, said blocks when occupying the spaces between said ribs being abuttable against one side edge of the mounted problem slip, said tray having a side wall portion which forms a stop against which the opposite side edge of the mounted problem slip is abuttable.

2. In an educational device of the kind described, a slip having a face lengthwise of which extend side by side a column of problems and a column of answers, each problem having its answer opposite thereto, the column of answers extending along one side of said face and the column of problems extending along the opposite side of said face, a base plate having an upwardly directed face with a series of transverse grooves extending thereacross, a plurality of blocks which have inscribed upon them answers to said problems on said slip, said blocks being seated in said grooves in positions wherein they are abuttable against the mounted problem slip, in which positions the blocks' under sides are at a lower level than the mounted slip, stop means carried by the device to prevent displacement of the mounted problem slip by said blocks if the seated blocks are abutted against said slip, the mounted problem slip being located between said stop means and the seated blocks, and a member attached to said base plate and normally concealing said answers, said member being movable to a position wherein it uncovers said answers.

3. The subject matter of claim 2, and said member consisting of a slide having through it a plurality of longitudinal slots, and pins carried by said base plate and slidably engaged by said slots.

ALBERT H. MERRILL.

References Cited in the file of this patent

UNITED STATES PATENTS

| Number | Name | Date |
|---|---|---|
| 163,912 | Birmeli | June 1, 1875 |
| 1,310,997 | Linay | July 22, 1919 |
| 1,629,635 | Parsons | May 24, 1927 |
| 1,696,988 | Troidl | Jan. 1, 1929 |
| 2,581,595 | Mioduski | Jan. 8, 1952 |